United States Patent Office 3,165,505
Patented Jan. 12, 1965

3,165,505
PROCESS FOR IMPROVING THE PROPERTIES
OF POLYETHYLENE
Rudolf Gaeth, Ludwigshafen (Rhine), Germany, assignor to Badische Anilin- & Soda-Fabrik Aktiengesellschaft, Ludwigshafen (Rhine), Germany
No Drawing. Continuation of application Ser. No. 419,903, Mar. 30, 1954. This application Nov. 9, 1961, Ser. No. 151,188
Claims priority, application Germany, Apr. 4, 1953, B 25,064
6 Claims. (Cl. 260—94.9)

This invention generally relates to a process for improving the properties of polyethylene. More specifically it relates to a process for homogenizing polyethylene.

Injection moldings, hollow articles and sheeting made of solid polyethylene with a mean molecular weight of more than 10,000 are liable to cracking or prolonged use. Moreover, polyethylene-made injection moldings, sheeting and extrusions, as for example hoses and cable sheathing, have a rough and dull surface and injection moldings, in addition, are liable to severe shrinkage in many cases. The "memory effect," i.e., the increase in the volume (similar to a swelling up) of the polyethylene which gives it the appearance of a swollen mass and which occurs when polyethylene is extruded from a nozzle in a fused state for filament formation, is relatively high, coming up to 95 to 100%. This phenomenon will be observed especially with films made by the blowing process; not only are they milky and dull but also covered with more or less large nodules called "fish eyes." In order to remedy these shortcomings the expedient heretofore resorted to was to subject the polyethylene to a homogenization process, in which the polyethylene was forced, while in a molten state, through narrow nips or channels defined by surfaces which were moved at a relative speed with respect to each other. By this treatment, it is true, said shortcomings are remedied to some extent, but the improvement achieved yet remained unsatisfactory.

I have now found that polyethylene of the said kind or a mixture of polyethylene with another highly polymerized hydrocarbon, such as polyisobutylene can be homogenized by a simple yet highly efficient technique and the product simultaneously improved in such a manner that it satisfies all requirements in practical use by forcing the polyethylene or polyethylene mixture (hereinafter briefly referred to as polyethylene), within a temperature range defined by their conversion point (about 60° C.) (cf. Transactions of the Faraday Society, vol. XLI, 1945, pages 49–56, especially page 50 beginning with line 13 from below, pages 54 and 56, each last paragraph) and their melting point (about 113° C.), but in any case below the melting point, through the nip between a plurality of rollers which are caused to rotate at different peripheral speeds. In an especially simple and efficient embodiment of my invention I use a pair of rollers and control their peripheral speeds so as to correspond to a minimum ratio of 1:1.2 and a maximum ratio of 1:5. Provision is made by cooling the rollers in an appropriate manner that the polyethylene does not melt during passage through the nip or nips. During passage between the rollers the polyethylene for a fraction of a second undergoes a mechanical treatment which creates a turbulence effect in the material. This effect is brought about by the enormous frictional forces which are a function of the speed at which the material passes through the nip or nips and of the different peripheral speeds of the rollers. The polyethylene emerges from the nip or nips in a crepe-like form or in form of a veil rather than in a compact sheet-like form. The creation of this turbulence effect in the polyethylene, while in the solid state, is the main feature of my invention.

It is important in the practice of my invention that the polyethylene should be homogenized while in the solid state, i.e., below its melting point and not in the fused state as in the case of the prior art processes. By the process according to my invention polyethylene can be homogenized considerably more rapidly and thoroughly than when treating it by the same method in the fused state. As stated above, the temperature interval within which my invention is practised ranges from the conversion point of polyethylene, i.e., about 60° C., to the melting point thereof, i.e., about 113° C. It was found that an optimum effect is obtained when working between 70° and 100° C. It is essential for the process that the nip through which the polyethylene is formed should be as narrow as possible, normally 0.1 millimeter or less.

The relative peripheral speed of the rollers and the speed at which the polyethylene passes through between them depend on the width of the nip. The lower relative peripheral speed ratios within the aforesaid range may be used at the narrower nip openings. These factors should not, however, in any case be such that the polyethylene comes to melt under the friction which occurs in the nip. The optimum speed at which the polyethylene passes through between the rollers lies between 0.5 and 1.5 meters per second. It thus stays less than a second in the nip of the rollers.

The apparatus used in the practice of my invention are those commonly used in the art and fitted with two, three or more rollers. The speed of said rollers can be controlled individually, i.e., each roller can run at a speed different from that of any other roller or rollers. During passage through the nip of any two rollers the polyethylene undergoes a mechanical treatment which creates a turbulence effect in the material, which at the same time is rolled out, while continuing in a solid condition, into a coherent, creped web.

My invention will now be described in greater detail in the following examples in which a polyethylene with a tensile strength of 120 to 150 kg./sq. cm. and an elongation at break of 350 to 500% was used. It was found that a 5% solution of this polyethylene in toluene is not clear at 80° C. and is therefore unsuitable to determine the molecular weight of polyethylene therefrom. By contrast, however, after having been treated by the method of my invention, the same polyethylene is clearly soluble in toluene and from this solution a molecular weight of 50,000 (according to Ueberreither) was determined. Unlike in the case of masticated rubber there is no decrease in the molecular weight of polyethylene homogenized in accordance with my invention. As an experiment showed polyethylene can be brought from the insoluble into the soluble state by being passed from only one time, at a temperature of 90° C., through rollers having a nip of about 0.01 millimeter and rotating at a relative speed of 1:2.5, the maximum speed at which the polyethylene passes through the rollers being 1 meter per second. After one passage the polyethylene had a molecular weight of 50,000, and this remained constant even after four more passages under equal conditions.

The improvements achieved by the homogenization process according to my invention are shown in the following table in which the properties of homogenized polyethylene are compared with those of untreated polyethylene:

|  | Untreated polyethylene | Homogenized polyethylene |
|---|---|---|
| Solubility of a 5% solution in toluene at 80° C. | Incompletely soluble, gelatinous, cloudy. | Completely soluble, clear. |
| Molecular weight | Cannot be determined accurately; 45,000 after filtering off the swollen material. | Can be determined without difficulty; 50,000. |
| Appearance of blown films. | dull, rough, "fish eyed"; processing temperature 180° C. | No "fish eyes"; clear, smooth surface; processing temperature 150° C. |
| Appearance of injection moldings. | Rough and dull surface, shrinkage in boiling water about 10 to 12%. | Smooth and practically transparent surface; shrinkage in boiling water about 5%. |
| Memory effect | 95 to 100% | 55%. |
| Tensile strength | 120 to 150 kg./sq. cm. with wide scattering of the measurement values. | 150 to 160 kg./sq. cm. with only slight scattering of the measurment values. |
| Elongation at break | 350 to 500%, i.e., great difference in data obtained. | 500 to 550%, i.e. slight difference in data obtained. |

The properties set forth in the foregoing list should be used as standards in evaluating the results obtained in working according to the following examples.

*Example 1*

Crude polyethylene having the properties indicated above was passed through between a pair of rollers, 80 cm. in diameter, which were cooled down with water to 20° C. The peripheral speed of the rollers was given a ratio of 1:1.2; the width of the nip between the rollers was 0.1 millimeter and the maximum speed at which the polyethylene passed through the nip was 1 meter per second. The residence time was therefore less than 100 milliseconds. Even after four passages, no appreciable improvement of the polyethylene had been achieved, apart from a slightly improved clarity and a lesser occurrence of "fish eyes" in blown films prepared therefrom. The fact was that the polyethylene had too low a temperature during treatment.

*Example 2*

The same type of polyethylene was treated three times in a roller system and under the same conditions as in Example 1, with the exception that the peripheral speed of the roller was given a ratio of 1:1.5. On passing through the nip the polyethylene had a temperature of 65° C. After three passages the homogeneity of the polyethylene was fully satisfactory.

*Example 3*

The conditions being the same as in Example 1, the peripheral speed of the rollers was given a ratio of 1:2.5. The homogeneity of the polyethylene was fully satisfactory after only two passages.

*Example 4*

The conditions being the same as in Example 1, the peripheral speed of the rollers was given a ratio of 1:4. On passing through the nip the polyethylene had a temperature of 85° C. The homogeneity of the material was fully satisfactory after only one passage.

*Example 5*

The conditions were those of Example 1 with the exception that the peripheral speed of the rollers was given a ratio of 1:5. This made the polyethylene pass through the nip of the rollers at a temperature of 105° C. At this temperature, which is above the optimum temperature and so close to the melting point that part of the granulated polyethylene undergoes melting on passing through the nip, three passages are required to achieve a fully satisfactory homogeneity. At a ratio upwards of 1:5, the frictional forces to which the polyethylene is put on passing through the rollers are so severe that the polyethylene comes to melt and as a result no satisfactory homogenization is achieved even after as many as ten passages through the rollers.

*Example 6*

The conditions being those of Example 1 the nip between the rollers was given a width of less than 0.01 millimeter. A satisfactory homogenization was obtained after three passages by the shearing effect resulting from the higher inner friction of the polyethylene.

*Example 7*

The conditions being those of Example 2 the nip between the rollers was given a width of less than 0.01 millimeter. Homogenization was achieved by two passages.

*Example 8*

The conditions being those of Example 3 the nip between the rollers was given a width of less than 0.01 millimeter. Homogenization was achieved by a single passage.

*Example 9*

While working under the conditions of Example 4 the polyethylene was used in admixture with polyisobutylene of a molecular weight of about 80,000, the latter being added in an amount between 5 and 30% of the mixture. A satisfactory homogenization was reached after one passage when the addition of polyisobutylene was less than 20%, and after one or two passages when more than 20% of polyisobutylene was added.

*Example 10*

While working under the conditions of Example 8 the polyethylene was used in admixture with polyisobutylene of a molecular weight of about 80,000, the latter being added in an amount between 5 and 30% of the mixture. A satisfactory homogenization was reached after one passage when the addition of polyisobutylene was less than 20%, and after one or two passages when more than 20% of polyisobutylene was added.

*Example 11*

While working under the conditions of Example 4 the polyethylene was added with a dyestuff of the type conventionally used for polyethylene in an amount of 0.01 to 5%. The polyethylene had become satisfactorily homogenized after one passage and, moreover, the dyestuff had spread outstandingly well throughout the polyethylene web, from which, as a result, homogeneously colored blown films of less than 50 microns in thickness can be produced. When, for comparison, the dyestuff was incorporated into the polyethylene in a screw machine, it was only inhomogeneously and irregularly distributed therein as it appeared from a pressed sheet.

*Example 12*

While working under the conditions of Example 8 the polyethylene was added with a dyestuff of the type conventionally used for polyethylene in an amount of 0.01 to 5%. The polyethylene had become satisfactorily homogenized after one passage and, moreover, the dyestuff had outstandingly well spread throughout the polyethylene web, from which, as a result, homogeneously colored blown films of less than 50 microns in thickness can be produced. When, for comparison, the dyestuff was incorporated into the polyethylene in a screw machine, it was only inhomogeneously and irregularly distributed therein as it appeared from a pressed sheet.

*Example 13*

The experiments described in Example 12 were carried out, for comparison purposes, under the conditions of Examples 4 and 8 with the modification that the rollers were heated to temperatures inadequate to my invention, i.e., to 110° and 120° C. respectively, the polyethylene thus being sufficiently heated to undergo melting. While the polyethylene was homogenized satisfactorily by only one passage when the temperature was maintained below the melting point, no satisfactory homogenization was achieved even with five passages under said conditions. The material was only negligibly improved under the modified conditions of Example 8 and was even less improved under the modified conditions of Example 4. This became apparent when blown films were made. Those obtained according to modified Example 4 were similar in appearance to those made of untreated polyethylene, while the films obtained according to modified Example 8 only had the "fish eyes" more finely distributed in them. In either case the films were dull and rough and there was no indication of the memory effect, the tensile strength, the elongation at break and the clarity of the material as well as its surface appearance having been affected in any distinct way.

This application is a continuation of my copending application Serial No. 419,903, filed March 30, 1954, and now abandoned.

I claim:

1. A process for improving the properties of solid polyethylene having a mean molecular weight exceeding 10,000 which comprises forcing said polyethylene in the solid state through the nip of a pair of rotating rollers at a speed of said polyethylene of 0.5 to 1.5 meters per second and a temperature of said polyethylene in said nip which is above 60° C. but below the melting point of said polyethylene, said nip being not larger than 0.1 mm. in width; in which nip a mechanical turbulence in the solid polyethylene is induced, and discharging the polyethylene from the nip of said rollers as solid, creped polyethylene.

2. The process as claimed in claim 1, wherein said polyethylene has a melting point of about 113° C.

3. The process as claimed in claim 1 wherein said rollers are rotated at different peripheral speeds corresponding to a ratio of between 1:1.2 to 1:5.

4. The process as claimed in claim 1 wherein a mixture of solid polyethylene with a minor proportion of another high polymer hydrocarbon is employed.

5. The process as claimed in claim 1, wherein the temperature of the polyethylene in the nip of the rollers is between 70° and 100° C.

6. A process for improving the properties of solid polyethylene having a mean molecular weight exceeding 10,000 which comprises forcing said polyethylene in the solid state through the nip of a pair of rotating rollers at a speed of said polyethylene of 0.5 to 1.5 meters per second and a temperature of said polyethylene in said nip which is above 60° C. but below the melting point of said polyethylene, said nip being not larger than 0.1 mm. in width, in which nip a mechanical turbulence in the solid polyethylene is induced, maintaining both of said pair of rollers at a cool surface temperature, and discharging the polyethylene from the nip of said rollers as solid, creped polyethylene.

References Cited in the file of this patent

UNITED STATES PATENTS

| 2,386,674 | Flint et al. | Oct. 9, 1945 |
| 2,631,954 | Bright | Mar. 17, 1953 |

FOREIGN PATENTS

| 644,429 | Great Britain | Oct. 11, 1950 |